Feb. 14, 1950    C. W. MOTT    2,497,319
AUTOMATIC RELEASE-AND-CATCH COUPLING DEVICE
Filed April 20, 1946
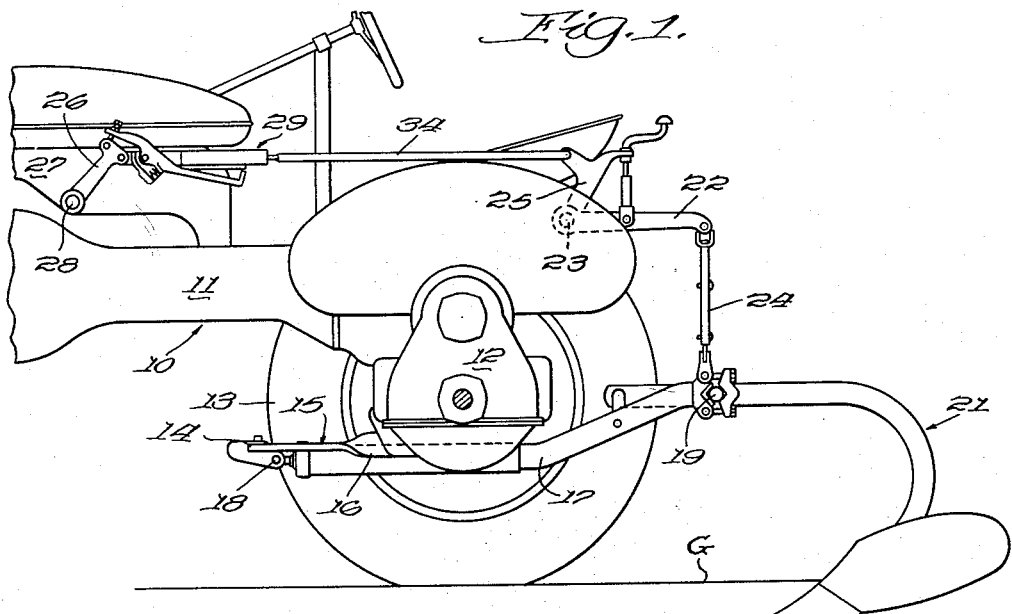
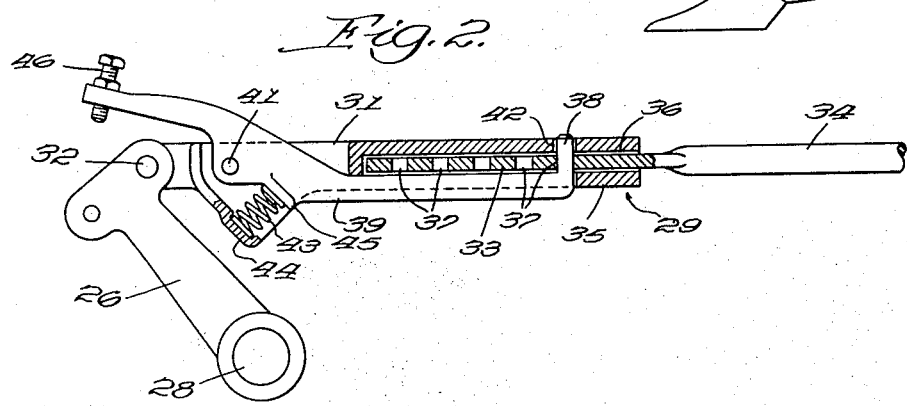
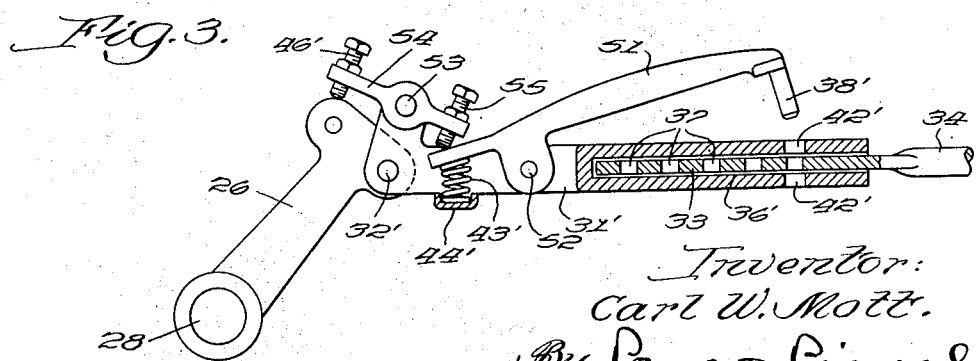
Inventor:
Carl W. Mott.
By Paul O. Pippel
Atty.

Patented Feb. 14, 1950

2,497,319

UNITED STATES PATENT OFFICE 2,497,319

AUTOMATIC RELEASE-AND-CATCH COUPLING DEVICE

Carl W. Mott, La Grange, Ill., assignor to International Harvester Company, a corporation of New Jersey Application April 20, 1946, Serial No. 663,712

6 Claims. (Cl. 74—593)

This invention concerns automatically releasable and connectable coupling devices, and more particularly relates to a device utilizable in a connection between a power driven rock-shaft arm of a tractor-mounted power-lift and a tractor-mounted implement for alternately connecting the power driven arm with the implement and releasing the arm from such implement while the implement is in a ground-engaging position.

A coupling device constructed according to the present invention is useful in tractor installations where a tractor-mounted implement, or the like, is movable between a transport position where it is carried upon the tractor and a ground-engaging operating position in which the implement can move over the ground in a manner unimpeded by any restraint of a connection between the implement and the tractor. The device is adapted to accomplish this function by disrupting the lifting connection between the implement and the power-lift rock-shaft arm when the implement is lowered to the operating position, while the device is serviceable to automatically reestablish the connection between the implement and arm when the latter is pivoted in the direction for lifting the implement to the transport position.

Heretofore the practice has been to simply provide a lost motion connection between a lift link for the implement and the rock-shaft arm of the power-lift mechanism. This practice has not been satisfactory, however, because the power-lift arm has had to be quite long to provide the amount of movement required of the link for manipulating the implement in between the working and transport position in addition to providing the additional movement for incurring a clearance in the lost motion connection. To obtain this relatively large amount of movement of the connecting point on the lift arm, the power-lift apparatus has had to operate at higher pressures than desired, particularly when the implements are heavy as in the case of listers, planters, and grain drills.

It is a primary object of the present invention to shorten the required length of the rock-shaft arm, the movement required at the point of attachment to such arm being only that necessary to actually lift the implement without providing any additional movement for creating clearance in a lost motion connection.

The above and other desirable objects of a more specific nature and advantage will be more clearly understood upon reading the ensuing description with reference to the annexed drawings, wherein:

Figure 1 is a side elevational view of the rear portion of a wheel tractor, one of the traction wheels being removed for more clearly illustrating an implement lifting linkage employing a coupling device constructed according to the present invention and also shown in side elevation.

Figure 2 is an enlarged view of the coupling device shown in Figure 1 with a portion shown in section for disclosing structural details.

Figure 3 is a side elevational view taken similarly to Figure 2 of a modified form of coupling device.

Referring now to Figure 1, the apparatus constituting the invention is shown in connection with a tractor 10 having a body frame 11. At the rear or right end of the body 11 there are a pair of laterally spaced depending gear housings 12, only one of which is shown, for gear trains which respectively drive traction wheels 13, of which one is shown. A bight 14 of a U-shaped draw-bar 15 projects forwardly of and between the gear housings 12 while the legs 16 of such draw-bar are mounted respectively upon said housings. Rearwardly extending arms 17 are pivotally connected at 18 with the draw-bar and serve with an implement attaching rod 19 carried on the rearward ends of these arms to support an implement 21 herein illustrated in the form of a lister.

The implement 21 is shown in its ground-engaging or operating position but may be lifted to a transport position above the ground by the counterclockwise pivoting of an arm 22 which has a fixed pivot at 23 and which has its rear end connected with the bar 19 and hence with the implement 21 by a linkage 24. Arm 22 is constrained for rotation with a coaxially rotatable arm 25.

The arm 25 is operably connected with a rock-shaft arm or force applying structure 26 of a power-lift apparatus contained within a casing 27 on the body of the tractor. Rocking motion is impartable to the arm 26 from the power-lift apparatus through a shaft 28 upon which the arm is mounted and with which said arm is constrained for rotation. The operating connection between the arms 25 and 26 is provided by a releasable coupling device 29, the details of which are shown in Figure 2.

Said coupling device 29 includes an elongated body 31 which is pivotally connected at its forward end by means of a pin 32 with the rock-shaft arm 26. The opposite end of said body is adapted for telescopic association with a flat end portion 33 of a link 34. A loop 35 around the rear end portion of the body 31 provides an opening 36 through which the end portion 33 of the link 34 projects and thereby provides a guide for the link and prevents the parts from dropping downwardly while they are telescopically adjusted. A series of holes 37 in the link 34 are adapted to individually receive a connecting means in the form of a projection 38 on the rear end of a lever 39 which is pivoted to the body 31 at 41. A hole 42 in the body 31 is also adapted to receive the connecting means 38.

When the arm or force applying structure 26 is advanced counterclockwise to the position shown in Figure 2, a spring 43 reacting between a seat 44 on such body and a boss 45 on the lever 39 is effective for pivoting such lever counterclockwise for projection of the connecting means stud 38 into any one of the openings or holes 37 in registry therewith and thence into the hole 42. With the stud 38 so associated with any of the holes in the link 34, a connection will be established by the device between the arms 26 and 25 so that advancement of the arms 26 into the position illustrated in Figure 2 will be effective for lifting the implement 21 into a transport position above the ground line G.

When the implement is lowered to its working position by retractive rocking of the arm 26 toward the position illustrated in Figure 1, the lower end of a set-screw 46 in the forward end of the lever 39 abuts against an upper end portion of the arm 26, thereby pivoting said lever 39 clockwise about its pivot 41 incident to compressing the spring 43 and pulling the stud 38 from the hole 42 and particularly one of the holes 37 in which it happens to have been disposed. With the rod or link 34 thus released, the implement 21 can rest upon and/or enter the ground and be moved up or down freely in conformation with the ground contour while reciprocating the flat end 33 of the rod 34 within the body 31 of the connecting device.

When it is subsequently desired to lift the floating implement, the power-lift arm 26 will be power pivoted counterclockwise, whereby the spring 43 will be no longer constrained and can pivot the lever 39 counterclockwise about the pivot 41 as soon as the stud 38 registers with one of the holes 37. The hole 37 registering with the stud 38 will depend upon the elevation of the implement with respect to the vehicle at the time the lift is being executed. Should the implement be at a considerably lower elevation than that of the tractor at the time of power advancing the rock-shaft arm 26, the flat end 33 of the rod 34 will be correspondingly more nearly withdrawn from its telescopic relation with the coupling device body 31, so that at the time the set-screw 46 becomes inoperative for constraining the spring 43, the stud 38 will be at a hole adjacently to the front or left end of the rod 34. As a consequence the entering of the stud 38 into such a hole will cause the ultimate transport position of the implement to be at a lower elevation. Ordinarily such lower elevation will be sufficiently high for transport, but if for some reason the operator of the machine should desire to elevate the transport position then he can do so by lowering the implement onto a ground surface of greater elevation than that from which the implement was initially raised, and subsequent to the detachment of the coupling device, initiate another advance of the rock-shaft arm whereby a hole 37 further from the left end of the rod 34 will be caused to register with the stud 38 and cause the implement to be raised to a higher elevation.

In the modification shown in Figure 3 those parts identical with parts of the first embodiment are designated by the same reference characters, while parts corresponding to parts of the first embodiment are designated by the same reference character with the addition of a prime. The second embodiment has a body 31' with an end recess 36' for telescopic reception of the flat end of a rod 34. Two holes 42' are provided for reception of a latch stud 38' on the end of a lever 51 pivotally connected to the body at 52. The forward left end of the lever 51 is pressed against by a spring 43' which thereby urges the stud 38' into the axially alined holes 42' and one of the holes 37 which may be in registry therewith. A second pivot, 53, is provided on the body 31' and pivotally supports a short lever 54 having a set-screw 46' in one end for cooperation with the upper end portion of the power-lift arm 26 and a set-screw 55 in its opposite end for abutment against the left end of the lever 51 to pivot such lever 51 into the position shown in Figure 3 incident to compressing the spring 43' when the arm 26 is rocked retractively into the Figure 3 position. As in the first embodiment, retractive rocking of the arm 26 will cause disruption of the connection between said arm and the implement by the removal of the stud 38' from its connecting position, while rocking of the arm 26 in the opposite direction will permit the spring to rock the levers 51 and 54 respectively clockwise and counterclockwise for inserting the stud 38' into one of the holes 37 preparatory to establishing the connection with the implement for raising the same from the operating position to the transport position with continued advancement of the power driven structure 26. One advantage of the embodiment shown in Figure 3 involves the use of the auxiliary lever 54 which is adapted to impose operating force from the upper end of the arm 26 onto the lever 51 at a shorter distance from the pivot 52 of such lever than the distance at which the operating force from the arm 26 is applied to the lever 39 from its pivot 41 in the first embodiment. Consequently, quicker movement is imparted to the stud 38' from the combination of levers 51 and 54 than is imparted to the stud 38 by the single lever 39.

Having described a limited number of embodiments of the invention with the view of clearly and concisely illustrating the same, I claim:

1. In a coupling device for establishing a releasable connection between a rockable structure and an elongated member having connecting sections distributed lengthwise thereof, a body for pivotal connection with said rockable structure and telescopic relation with said elongated member to incur a change in the angular relation between said structure and said body pursuant to rocking of said structure, connecting means on said body for connecting the same with said connecting sections but manipulatable thereon into a releasing position to release such connection, and means for so manipulating said connecting means pursuant to movement of said structure and body into a predetermined angular relation.

2. In a coupling device for establishing a releasable connection between a rockable structure and a member to cause movement of said member during the establishment of said connection when the structure is rocked, a body for pivotal attachment with said structure for movement thereby and angular movement relatively thereto pursuant to pivoting of said structure, said body also being adapted for movement relatively to said member when moved with said structure, connecting means on said body operable to preclude such relative movement between said body and said member and thereby attain said connection but manipulatable on said body into a releasing position to facilitate such relative movement and thereby disrupt such connection, and means pivotally mounted on said body and reactable between such body and the rockable structure for so manipulating said connecting means pursuant to movement of said structure and body into a predetermined angular relation.

3. In a coupling device for establishing a releasable connection between a rockable structure and a member to cause movement of said member during the establishment of said connection when the structure is rocked, a body for pivotal attachment with said structure for movement thereby and angular movement relatively thereto pursuant to pivoting of said structure, said body also being adapted for movement relatively to said member when moved with said structure, connecting means advanceable into an active position to preclude such relative movement between said body and said member and thereby attain said connection but retractible from such position to disrupt such connection, means yieldably urging said connecting means into the active position and effective of that purpose when unopposed, and means operable by said structure to retract and retain said connecting means retracted in opposition to said urging means pursuant to the disposal of said structure and body within one range of their relative angularity and to terminate the opposition to said connecting means when said structure and body are within another range of their angularity.

4. In a coupling device for establishing a releasable connection between a rockable structure and a member to cause movement of said member during the establishment of said connection when the structure is rocked, a body for pivotal attachment with said structure for movement thereby and angular movement relatively thereto pursuant to pivoting of said structure, said body also being adapted for movement relatively to said member when moved with said structure, lever means pivoted on said body, connecting means carried by said lever means and disposed by said lever means in an operable position to preclude such relative movement between said body and member and thereby attain said connection when the lever means is pivoted in one direction but disposed in a releasing position to facilitate such relative movement and thereby disrupt said connection when the lever means is pivoted in the other direction, spring means reacting between said body and the lever means for urging such lever means to pivot in the one direction, said spring means being effective for so pivoting the lever means while the rockable structure and said body are in one angular relation, and a portion of said rockable structure being disposed for abutment with said lever means for pivoting the same in said other direction against the force of said spring to disrupt said connection when the rockable structure and said body are placed in another angular relation.

5. In a coupling device for establishing a releasable connection between a force-applying structure capable of alternate advancement and retraction and a member adapted to be moved by force applied by said structure, said device including a body, means for pivotally connecting said body with said structure for advancement and retraction therewith, said body being adapted to react against said member while advanced and retracted with said structure to cause relative pivotal movement of said body and structure, and means pivotally mounted on said body and responsive to relative pivotal positions of said body and said structure for connecting said member with said body while said structure is in positions advanced from a retracted position and for releasing said member from said body when the structure is retracted to such position.

6. In a coupling device for establishing a releasable connection between a force-applying structure capable of alternate advancement and retraction and a member adapted to be moved by force applied by said structure and having adjacent connecting sections, said device including a body, means for pivotally connecting said body with said structure for advancement and retraction therewith, connecting means pivotally mounted on said body and adapted for connection with respective of said sections while registered therewith, said body being advanced and retracted with said structure when pivotally connected therewith and being thus operable to move the connecting means in successive registry with the connecting sections, said body being reactive on said member to cause relative pivotal movement of such member and structure during such advancement and retraction with said structure, and said connecting means being responsive to relative pivotal positions of said body and said structure for connecting with any of the connecting sections registered therewith while said structure is in positions advanced from a retracted position and for releasing such sections while the structure is retracted to such position.

CARL W. MOTT.

REFERENCES CITED

The following references are of record in the file of this patent:

UNITED STATES PATENTS

| Number | Name | Date |
| --- | --- | --- |
| 725,756 | Murphy | Apr. 21, 1903 |
| 1,883,767 | Crewe | Oct. 18, 1932 |
| 2,210,661 | Fincher | Aug. 6, 1940 |
| 2,249,807 | Brown | July 22, 1941 |
| 2,409,509 | Mott | Oct. 15, 1946 |